(12) United States Patent
Nemoto

(10) Patent No.: US 10,220,849 B2
(45) Date of Patent: Mar. 5, 2019

(54) CONTROL APPARATUS OF VEHICLE

(71) Applicant: TOYOTA JIDOSHA KABUSHIKI KAISHA, Toyota-shi (JP)

(72) Inventor: Yusuke Nemoto, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 182 days.

(21) Appl. No.: 15/266,800

(22) Filed: Sep. 15, 2016

(65) Prior Publication Data

US 2017/0072956 A1 Mar. 16, 2017

(30) Foreign Application Priority Data

Sep. 15, 2015 (JP) .................................. 2015-182350

(51) Int. Cl.
*B60W 30/16* (2012.01)
*B60W 10/184* (2012.01)
(Continued)

(52) U.S. Cl.
CPC .......... *B60W 30/162* (2013.01); *B60W 10/06* (2013.01); *B60W 10/184* (2013.01); *B60W 10/20* (2013.01); *B60W 30/16* (2013.01); *G08G 1/161* (2013.01); *G08G 1/22* (2013.01); *B60W 2050/0008* (2013.01); *B60W 2050/0012* (2013.01); *B60W 2520/28* (2013.01);
(Continued)

(58) Field of Classification Search
CPC ......... B60W 10/20; B60W 2050/0008; B60W 2050/0012; B60W 2550/30; B60W 2550/408; B60W 2720/106; B60W 30/16; B60W 30/162; G08G 1/22; G08G 1/161

USPC ....... 701/70, 96, 301, 300, 53; 340/436, 903
See application file for complete search history.

(56) References Cited

U.S. PATENT DOCUMENTS 5,781,119 A * 7/1998 Yamashita ............. G05D 1/024
180/168
6,032,097 A * 2/2000 Iihoshi ..................... G08G 1/22
180/168
(Continued)

FOREIGN PATENT DOCUMENTS

JP 2009-18727 A 1/2009
JP 2012-25352 A 2/2012
JP 2015-051716 A 3/2015

*Primary Examiner* — Dalena Tran
(74) *Attorney, Agent, or Firm* — Oblon, McClelland, Maier & Neustadt, L.L.P.

(57) ABSTRACT

A control apparatus of a vehicle that calculates a feedback requested acceleration for maintaining an inter-vehicle distance to a target distance and a feedforward requested acceleration for causing the own vehicle to travel following a communicating preceding vehicle and calculates a requested acceleration of the own vehicle on the basis of the feedback and feedforward requested accelerations. The apparatus executes a control that causes the own vehicle to travel following the preceding vehicle by controlling the acceleration of the own vehicle such that the acceleration of the own vehicle corresponds to the requested acceleration of the own vehicle. The apparatus sets the feedforward requested acceleration to zero when a shift lever of the preceding vehicle is positioned at a shift position other than a shift position that causes the preceding vehicle to travel forward and the feedforward requested acceleration is larger than zero.

4 Claims, 6 Drawing Sheets

(51) Int. Cl.
*G08G 1/00* (2006.01)
*G08G 1/16* (2006.01)
*B60W 10/06* (2006.01)
*B60W 10/20* (2006.01)
*B60W 50/00* (2006.01)

(52) U.S. Cl.
CPC ..... *B60W 2540/16* (2013.01); *B60W 2550/30* (2013.01); *B60W 2550/408* (2013.01); *B60W 2720/106* (2013.01)

(56) References Cited

U.S. PATENT DOCUMENTS

| | | | |
|---|---|---|---|
| 7,653,473 B2 * | 1/2010 | Yoshida | G08G 1/161 701/96 |
| 9,043,088 B2 | 5/2015 | Isaji et al. | |
| 2013/0124064 A1 | 5/2013 | Nemoto | |
| 2015/0178247 A1 | 6/2015 | Kinoshita et al. | |
| 2015/0274162 A1 | 10/2015 | Sato | |
| 2016/0200320 A1 | 7/2016 | Nemoto | |
| 2017/0015203 A1 | 1/2017 | Oguri | |
| 2017/0072953 A1 | 3/2017 | Nemoto | |
| 2017/0072957 A1 | 3/2017 | Nemoto | |
| 2017/0082452 A1 | 3/2017 | Sumizawa | |
| 2017/0116854 A1 | 4/2017 | Sugawara | |
| 2017/0120912 A1 | 5/2017 | Ishioka | |

\* cited by examiner

CONTROL APPARATUS OF VEHICLE

BACKGROUND

Technical Field

The present invention relates to a control apparatus of a vehicle for controlling an acceleration including a deceleration of an own vehicle to travel the own vehicle to follow a preceding vehicle.

Description of the Related Art

A control apparatus of a vehicle that controls an acceleration of an own vehicle to travel the own vehicle to follow a preceding vehicle is described in JP 2015-51716 A. This control apparatus (hereinafter, will be referred to as "the conventional apparatus") is configured to acquire a distance between the own vehicle and the preceding vehicle as an inter-vehicle distance and a traveling speed of the own vehicle as an own vehicle speed using sensors of the own vehicle and acquire a requested acceleration information of the preceding vehicle from the preceding vehicle through a wireless communication.

The conventional apparatus acquires an inter-vehicle time by dividing the acquired inter-vehicle distance by the acquired own vehicle speed and calculates a feedback requested acceleration which is an acceleration of the own vehicle requested for making the inter-vehicle time correspond to a target inter-vehicle time corresponding to a target value of the inter-vehicle time on the basis of a difference between the inter-vehicle time and the target inter-vehicle time. Further, the conventional apparatus calculates a feedforward requested acceleration which is an acceleration of the own vehicle requested for causing the own vehicle to travel following the preceding vehicle on the basis of the acquired requested acceleration information of the preceding vehicle.

Lastly, the conventional apparatus sets a total value of the feedback requested acceleration and the feedforward requested acceleration as a requested acceleration of the own vehicle and accelerates or decelerates the own vehicle to achieve the requested acceleration.

BRIEF SUMMARY

The preceding vehicle may send a requested acceleration to the own vehicle as a requested acceleration information of the preceding vehicle, the sent requested acceleration of the preceding vehicle being calculated on the basis of an operation amount of an acceleration pedal (or an acceleration operation element) and an operation amount of a brake pedal (or a brake operation element). In this case, the conventional apparatus calculates a feedforward requested acceleration on the basis of the requested acceleration of the preceding vehicle sent from the preceding vehicle.

On the other hand, even when an operation amount of the acceleration pedal of the preceding vehicle increases under the condition that a shift lever of the preceding vehicle is positioned at a neutral position (i.e., an N-position) or a parking position (i.e., a P-position), the preceding vehicle does not accelerate. On the other hand, when the operation amount of the acceleration pedal of the preceding vehicle increases under the condition that the shift lever of the preceding vehicle is positioned at the N-position or the P-position, a requested acceleration calculated on the basis of the increased operation amount of the acceleration pedal is sent from the preceding vehicle to the own vehicle as the requested acceleration of the preceding vehicle.

In this case, if the requested acceleration of the own vehicle is set using a feedforward requested acceleration calculated on the basis of the requested acceleration sent from the preceding vehicle, although the preceding vehicle does not accelerate, the own vehicle is caused to be accelerated at an acceleration depending on the requested acceleration of the preceding vehicle and thus, the inter-vehicle distance decreases. In this case, the own vehicle cannot travel accurately following the preceding vehicle.

Further, when the operation amount of the acceleration pedal of the preceding vehicle increases under the condition that the shift lever of the preceding vehicle is positioned at a rearward position (i.e. an R-position), the preceding vehicle travels rearward. Also, in this case, the preceding vehicle sends, as the requested acceleration of the preceding vehicle to the own vehicle, a requested acceleration calculated on the basis of the increased operation amount of the acceleration pedal.

In this case, the requested acceleration of the preceding vehicle sent from the preceding vehicle to the own vehicle has been calculated on the basis of the increased operation amount of the acceleration pedal and thus, the sent requested acceleration is a positive value. Therefore, if the requested acceleration of the own vehicle is set using a feedforward requested acceleration calculated on the basis of the sent requested acceleration, although the preceding vehicle travels rearward, the own vehicle is caused to be accelerated forward at an acceleration depending on the requested acceleration of the preceding vehicle and thus, the inter-vehicle distance decreases. Also, in this case, the own vehicle cannot be caused to be traveled accurately following the preceding vehicle.

The present disclosure has been made for addressing a problem described above. Accordingly, one of objects of the present disclosure is to provide a control apparatus of a vehicle which can cause the own vehicle to travel accurately following the preceding vehicle while preventing the inter-vehicle distance from excessively decreasing.

The control apparatus according to the present disclosure (hereinafter, this apparatus will be referred to as "the present apparatus") comprises:

an inter-vehicle distance detection device (60, 61) that detects an inter-vehicle distance (D) between an own vehicle (10) and a communicating preceding vehicle (11);

a wireless device (80, 81) that acquires communicating preceding vehicle information including requested acceleration information (Gs, Accp, Brkp) on a requested acceleration of the communicating preceding vehicle (11) from the communicating preceding vehicle (11) through a wireless communication; and an acceleration control device (20, 30, 40) that controls an acceleration of the own vehicle (10) such that the acceleration of the own vehicle (10) corresponds to a requested acceleration (Gj) of the own vehicle (10).

The acceleration control device includes first to third calculation means.

The first calculation means is configured to calculate a feedback requested acceleration (GFB) which is an acceleration requested to the own vehicle (10) for maintaining the inter-vehicle distance (D) to a target inter-vehicle distance (Dtgt) (see a step 280 of FIG. 2 and a routine shown in FIG. 5).

The second calculation means is configured to calculate a feedforward requested acceleration (GFF) which an acceleration requested to the own vehicle (10) for causing the own vehicle (10) to travel following the communicating preceding vehicle (11) on the basis of the requested acceleration information (see a step 270 of FIG. 2 and a routine shown in FIG. 4).

The third calculation means is configured to calculate a requested acceleration (Gj) of the own vehicle (10) on the basis of the feedback requested acceleration (GFB) and the feedforward requested acceleration (GFF) (see a step 285 of FIG. 2).

The acceleration control device executes a following travel control that causes the own vehicle (10) to travel following the communicating preceding vehicle (11) by controlling an acceleration of the own vehicle (10) such that the acceleration of the own vehicle (10) corresponds to the requested acceleration of the own vehicle (10) calculated by the third calculation means.

According to the following travel control, the own vehicle can be caused to be traveled following the communicating preceding vehicle at an acceleration depending on the requested acceleration of the communicating preceding vehicle.

Further, the third calculation means is configured to set the feedforward requested acceleration (GFF) to zero (see a step 423 of FIG. 4) when the communicating preceding vehicle information includes information indicating that a shift lever (92) of the communicating preceding vehicle (11) is positioned at a shift position other than a shift position that causes the communicating preceding vehicle (11) to travel forward (see a case of a determination "Yes" at a step 415 of FIG. 4) and the feedforward requested acceleration (GFF) is larger than zero (see a case of a determination "Yes" at a step 420).

In this case, when a control apparatus of the communicating preceding vehicle (11) does not execute the same control that causes the communicating preceding vehicle (11) to travel following a vehicle traveling in front of the communicating preceding vehicle (11) as the following travel control executed by the acceleration control device (20, 30, 40), the requested acceleration (Gs) of the communicating preceding vehicle (11) is, for example, a requested acceleration calculated by the control apparatus of the communicating preceding vehicle (11) on the basis of an operation amount (Accp) of an acceleration operation element of the communicating preceding vehicle (11) and an operation amount (Brkp) of a brake operation element of the communicating preceding vehicle (11).

Further, when the control apparatus of the communicating preceding vehicle (11) executes the same control that causes the communicating preceding vehicle (11) to travel following the vehicle traveling in front of the communicating preceding vehicle (11) as the following travel control executed by the acceleration control device (20, 30, 40), the requested acceleration (Gs) of the communicating preceding vehicle (11) is, for example, a requested acceleration of the communicating preceding vehicle (11) calculated by the control apparatus of the communicating preceding vehicle (11) on the basis of acceleration information (Gss, Gass) on the acceleration of the vehicle traveling in front of the communicating preceding vehicle (11) acquired by the control apparatus of the communicating preceding vehicle (11) from the vehicle traveling in front of the communicating preceding vehicle (11) through the wireless communication.

The present apparatus sets the feedforward requested acceleration to zero, that is, limits the feedforward requested acceleration to a value equal to or smaller than zero when the communicating preceding vehicle information includes information indicating that the shift lever of the communicating preceding vehicle is positioned at the shift position other than the shift position that causes the communicating preceding vehicle to travel forward and the feedforward requested acceleration is larger than zero. Thus, when the shift lever of the communicating preceding vehicle is positioned at the shift position other than the shift position that causes the communicating preceding vehicle to travel forward and thus, the communicating preceding vehicle does not accelerate at an acceleration depending on the requested acceleration of the communicating preceding vehicle, the feedforward requested acceleration is set to a value equal to or smaller than zero. Therefore, when the communicating preceding vehicle does not accelerate, the own vehicle is not caused to be accelerated due to the feedforward requested acceleration. As a result, the own vehicle can be caused to be traveled accurately following the communicating preceding vehicle.

Under the condition that the actual acceleration of the communicating preceding vehicle is calculated on the basis of at least one vehicle wheel speed of the communicating preceding vehicle detected by a vehicle wheel speed sensor of the communicating preceding vehicle, for example, when the shift lever of the communicating preceding vehicle is positioned at the rearward position and then, the communicating preceding vehicle starts to travel rearward, the calculated actual acceleration of the communicating preceding vehicle is a positive value. When the requested acceleration of the own vehicle is calculated using actual acceleration information on the calculated actual acceleration of the communicating preceding vehicle, the calculated requested acceleration may be a positive value. In this case, the own vehicle may be caused to be accelerated and then, the inter-vehicle distance may decrease.

Accordingly, when the wireless device (80, 81) is configured to acquire actual acceleration information from the communicating preceding vehicle (11) through the wireless communication, the actual acceleration information relating to the actual acceleration (Gas) of the communicating preceding vehicle (11) calculated by the control apparatus of the communicating preceding vehicle (11) on the basis of at least one vehicle wheel speed ($\omega a$ to $\omega d$) of the communicating preceding vehicle (11) detected by the vehicle wheel speed sensor (42a to 42d) of the communicating preceding vehicle (11), the second calculation means may be configured to calculate the feedforward requested acceleration (GFF) on the basis of the acquired actual acceleration information and the acquired requested acceleration information.

Thereby, under the condition that the feedforward requested acceleration is calculated on the basis of the requested acceleration information of the communicating preceding vehicle and the actual acceleration information of the communicating preceding vehicle, when the shift lever is positioned at the shift position other than the shift position for traveling the communicating preceding vehicle forward, the feedforward requested acceleration is limited to a value equal to or smaller than zero. Thus, for example, when the shift lever of the communicating preceding vehicle is positioned at the rearward position and then, the communicating preceding vehicle starts to travel rearward, the own vehicle is not caused to be accelerated forward and thus, the inter-vehicle distance does not decrease. As a result, the own vehicle can be caused to be traveled following the communicating preceding vehicle.

In the above description, for facilitating understanding of the present disclosure, elements of the present disclosure corresponding to elements of an embodiment described later are denoted by reference symbols used in the description of the embodiment accompanied with parentheses. However, the elements of the present disclosure are not limited to the elements of the embodiment defined by the reference symbols. The other objects, features and accompanied advantages of the present disclosure can be easily understood from the description of the embodiment of the present disclosure along with the drawings.

DETAILED DESCRIPTION

Below, a control apparatus of a vehicle according to an embodiment of the present disclosure will be described with reference to the drawings. Hereinafter, the control apparatus according to the embodiment will be referred to as "the embodiment control apparatus". In the description, the drawings and the claims, the own vehicle is a subject vehicle, to which the present disclosure is applied and the preceding vehicle is a vehicle which travels in front of the own vehicle, is acquired by a sensor installed in the own vehicle as described later and outputs information permitted to be used by the control apparatus of the own vehicle to change a control for causing the own vehicle to travel.

Figure 1:
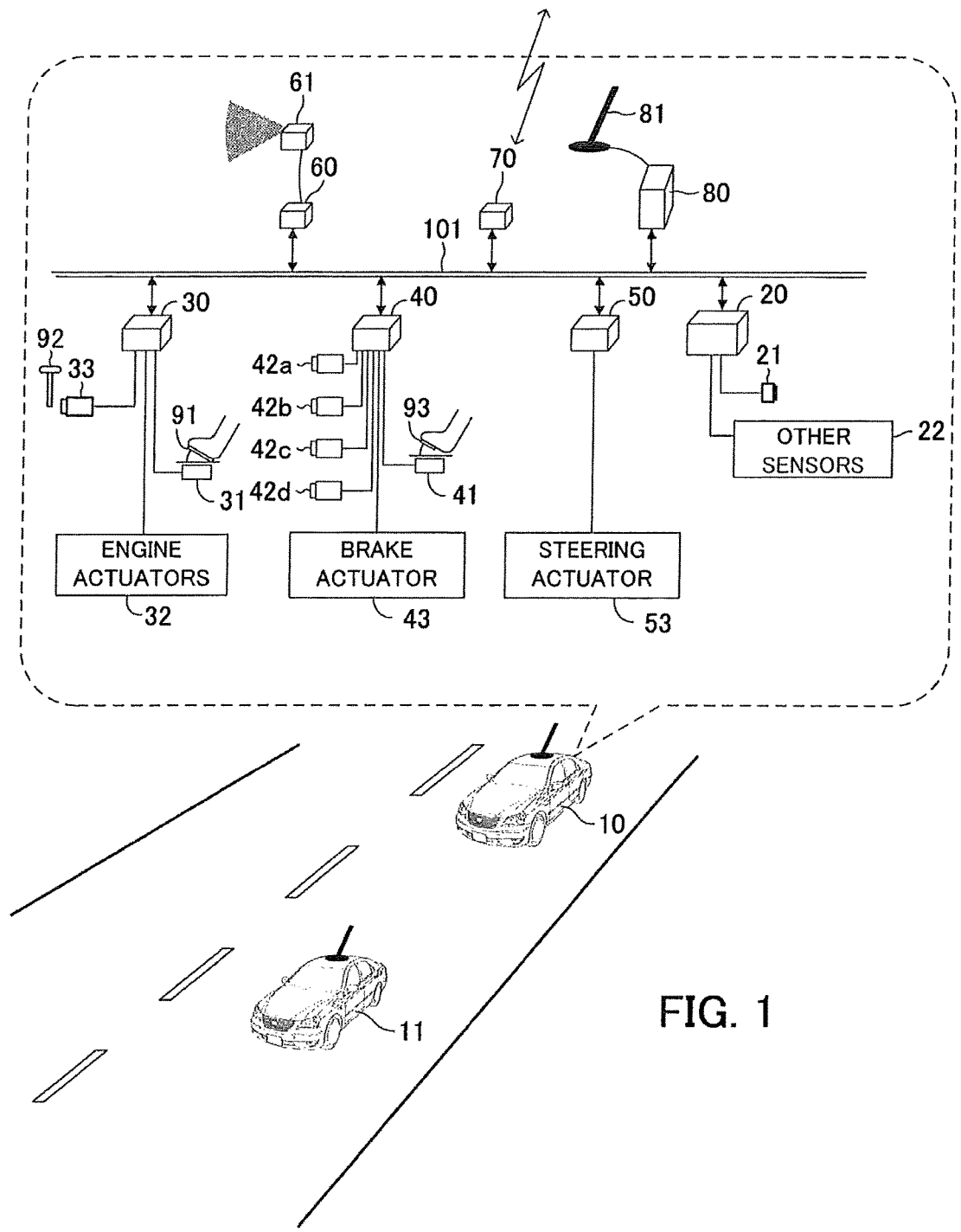
FIG. 1 shows a general configuration view of a control apparatus of a vehicle according to an embodiment of the present disclosure and the vehicle installed with the control apparatus.

As shown in FIG. 1, the embodiment control apparatus is applied to a vehicle (an own vehicle) 10. The own vehicle 10 comprises a vehicle control ECU 20, an engine control ECU 30, an acceleration pedal operation amount sensor 31, a shift position sensor 33, a brake control ECU 40, a brake pedal operation amount sensor 41, vehicle wheel speed sensors 42a to 42d, a steering control ECU 50, a sensor ECU 60, an own vehicle sensor 61, a GPS device 70, a wireless communication control ECU 80 and a wireless antenna 81. A preceding vehicle 11 has the same configuration as the configuration of the own vehicle 10.

The vehicle control ECU 20 can send data to and receive data from, that is, can communicate with the engine control ECU 30, the brake control ECU 40, the steering control ECU 50, the sensor ECU 60, the GPS device 70 and the wireless communication control ECU 80 via a sensor system CAN (i.e., a sensor system Controller Area Network) 101. Each of the ECUs is an electronic control unit and includes, as a main part, a microcomputer including a CPU, a ROM, a RAM, an interface and the like. The CPU is configured or programmed to execute instructions (or programs) stored in a memory (i.e., the ROM) to realize various functions described later.

The vehicle control ECU 20 is electrically connected to a cooperative following travel control request switch 21 which is an ON-OFF switch and various sensors 22. Hereinafter, the cooperative following travel control request switch 21 will be referred to as "the CACC switch 21".

When the CACC switch 21 is set to an ON-position by an occupant (in particular, a driver) of the own vehicle 10, a start of an execution of a cooperative following travel control described later is requested to the vehicle control ECU 20. The cooperative following travel control includes an inter-vehicle distance control described later.

The engine control ECU 30 is known and is configured or programmed to acquire detection signals from sensors (not shown) that detect various engine operation state amounts. In particular, the engine control ECU 30 is electrically connected to the acceleration pedal operation amount sensor 31 and the shift lever position sensor 33.

The acceleration pedal operation amount sensor 31 detects an operation amount Accp of an acceleration pedal 91 or an acceleration operation element 91 and outputs a detection signal expressing the operation amount Accp to the engine control ECU 30. The engine control ECU 30 is configured or programmed to acquire the acceleration pedal operation amount Accp on the basis of the detection signal, calculate or acquire a requested acceleration Gj on the basis of the acquired acceleration pedal operation amount Accp and store the calculated requested acceleration Gj in the RAM of the engine control ECU 30. It should be noted that the engine control ECU 30 may be configured or programmed to calculate the requested acceleration Gj on the basis of a traveling speed SPD of the own vehicle 10 acquired as described later and an engine speed NE. Hereinafter, the traveling speed SPD will be referred to as "the own vehicle speed SPD".

A shift lever 92 is operated by the driver of the own vehicle 10 and can be positioned at any one of following positions.

1) A first forward-traveling position (a D-position) to be positioned for traveling the own vehicle 10 forward.

2) A second forward-traveling position (a B-position) to be positioned for traveling the own vehicle 10 forward.

3) A neutral position (a N-position) to be positioned for stopping a transmission of a torque output from an internal combustion engine (not shown) to driving wheels of the own vehicle 10.

4) A rearward-traveling position (an R-position) to be positioned for traveling the own vehicle 10 rearward.

5) A parking position (a P-position) to be positioned for maintaining the own vehicle 10 stopped.

The shift position sensor 33 detects a shift position SL, at which the shift lever 92 of the own vehicle 10 is positioned and output a detection signal expressing the shift position SL of the shift lever 92 to the engine control ECU 30. The engine control ECU 30 is configured or programmed to acquire the shift position SL on the basis of the detection signal and send a signal S expressing the acquired shift position SL to the vehicle control ECU 20. Hereinafter, the signal S will be referred to as "the shift lever position signal S".

The engine control ECU 30 sends a signal Sd to the vehicle control ECU 20 as the shift lever position signal S when the shift lever 92 is positioned at the first forward-traveling position (the D-position). The engine control ECU 30 sends a signal Sb to the vehicle control ECU 20 as the shift lever position signal S when the shift lever 92 is positioned at the second forward-traveling position (the B-position) for providing a transmission gear ratio different from a transmission gear ratio provided by the first forward-traveling position.

Further, the engine control ECU 30 sends a signal Sn to the vehicle control ECU 20 as the shift lever position signal S when the shift lever 92 is positioned at the neutral position (the N-position). The engine control ECU 30 sends a signal Sr to the vehicle control ECU 20 as the shift lever position signal S when the shift lever 92 is positioned at the rearward-traveling position (the R-position). The engine control ECU 30 sends a signal Sp to the vehicle control ECU 20 as the shift lever position signal S when the shift lever 92 is positioned at the parking position (the P-position).

It should be noted that a transmission ECU (not shown) is configured or programmed to acquire the shift lever position signal S from the engine control ECU 30 and control a transmission stage of an automatic gear transmission (not shown) to one of stages including neutral and parking stages depending on the shift position SL of the shift lever 92 indicated by the shift lever position signal S.

Further, engine actuators 32 including a throttle valve actuator (not shown) are electrically connected to the engine control ECU 30. The engine control ECU 30 is configured or programmed to activate the engine actuators 32 to change a torque generated by the engine (not shown) of the own vehicle 10 such that an acceleration of the own vehicle 10 approaches the requested acceleration Gj when the requested acceleration Gj of the own vehicle 10 is a positive value, that is, when the own vehicle 10 is requested to be accelerated.

The brake control ECU 40 is known and is configured or programmed to acquire detection signals from sensors (not shown) that detects various vehicle operation state amounts. In particular, the brake control ECU 40 is electrically connected to the brake pedal operation amount sensor 41 and the vehicle wheel speed sensors 42a to 42d.

The brake pedal operation amount sensor 41 detects an operation amount Brkp of a brake pedal 93 or a brake operation element 93 and outputs a signal expressing the operation amount Brkp to the brake control ECU 40. Hereinafter, the operation amount Brkp will be referred to as "the brake pedal operation amount Brkp". The brake control ECU 40 is configured or programmed to acquire the brake pedal operation amount Brkp on the basis of the detection signal sent from the brake pedal operation amount sensor 41, calculate or acquire the requested acceleration Gj including the requested deceleration on the basis of the acquired brake pedal operation amount Brkp and store the calculated requested acceleration Gj in the RAM of the brake control ECU 40. It should be noted that the brake control ECU 40 may be configured or programmed to calculate the requested acceleration Gj on the basis of the own vehicle speed SPDj acquired as described later.

The vehicle wheel speed sensors 42a to 42d are provided on the respective vehicle wheels of the own vehicle 10. The vehicle wheel speed sensors 42a to 42d detect vehicle wheel rotation speeds $\omega a$ to $\omega d$ of the vehicle wheels, respectively and output detection signals expressing the vehicle wheel rotation speeds $\omega a$ to $\omega d$, respectively to the brake control ECU 40.

The brake control ECU 40 is configured or programmed to acquire the vehicle wheel rotation speeds $\omega a$ to $\omega d$ on the basis of the detection signals and store the acquired vehicle wheel rotation speeds $\omega a$ to $\omega d$ in the RAM of the brake control ECU 40.

Further, the brake control ECU 40 is configured or programmed to calculate or acquire an average value $\omega ave$ of the acquired vehicle wheel rotation speeds $\omega a$ to $\omega d$ ($\omega ave = (\omega a + \omega b + \omega c + \omega d)/4$) and store the calculated average value $\omega ave$ as the own vehicle speed SPDj of the own vehicle 10 in the RAM of the brake control ECU 40. Hereinafter, the average value $\omega ave$ will be referred to as "the average vehicle wheel rotation speed $\omega ave$".

Alternatively, the brake control ECU 40 may be configured or programmed to acquire the own vehicle speed SPDj on the basis of a detection signal output from a sensor (not shown) that detects a rotation speed of a propeller shaft of the own vehicle 10 in place of acquiring the average vehicle wheel rotation speed $\omega ave$ as the own vehicle speed SPDj.

Further, the brake control ECU 40 is configured or programmed to calculate an amount of a change of the acquired own vehicle speed SPDj per minute unit time, that is, calculate a time derivative value of the own vehicle speed SPDj as an actual acceleration Gaj ($=dSPDj/dt$) and store the calculated actual acceleration Gaj in the RAM of the brake control ECU 40.

Further, a brake actuator 43 of a friction braking device or the like is electrically connected to the brake control ECU 40. The brake control ECU 40 is configured or programmed to activate the brake actuator 43 to generate friction braking forces at the vehicle wheels of the own vehicle 10, respectively such that the deceleration of the own vehicle 10 approaches the requested acceleration Gj corresponding to the requested deceleration when the requested acceleration Gj of the own vehicle 10 is a negative value, that is, when the deceleration of the own vehicle 10 is requested.

The steering control ECU 50 is known and is configured or programmed to acquire detection signals from sensors (not shown) that detects various vehicle operation state amounts. Further, a steering actuator 53 such as a motor of an electric power steering device (not shown) is electrically connected to the steering control ECU 50.

The sensor ECU 60 is electrically connected to the own vehicle sensor 61. The own vehicle sensor 61 is a known millimeter wave radar sensor. The own vehicle sensor 61 outputs a millimeter wave ahead of the own vehicle 10. The millimeter wave is reflected by the preceding vehicle 11. The own vehicle sensor 61 receives this reflected millimeter wave.

The sensor ECU 60 is configured or programmed to detect the preceding vehicle 11 traveling immediately in front of the own vehicle 10 on the basis of the reflected millimeter wave received by the own vehicle sensor 61. Further, the sensor ECU 60 is configured or programmed to acquire a difference dSPD between the own vehicle speed SPDj and a traveling speed SPDs of the preceding vehicle 11 (i.e., a relative traveling speed dSPD between the own vehicle 10 and the preceding vehicle 11) (dSPD=SPDs−SPDj), an inter-vehicle distance D between the own vehicle 10 and the preceding vehicle 11 and a relative orientation of the preceding vehicle 11 with respect to the own vehicle 10 in a chronological manner each time a predetermined time elapses on the basis of a phase difference between the millimeter wave output from the own vehicle sensor 61 and the reflected millimeter wave received by the own vehicle sensor 61, a damping level of the reflected millimeter wave, a detection time of the reflected millimeter wave and the like and store the acquired relative speed dSPD, the inter-vehicle distance D, the relative orientation and the like in the RAM of the sensor ECU 60.

Therefore, the sensor ECU 60 constitutes an own vehicle sensor device that detects or acquires the preceding vehicle 11 on the basis of the reflected millimeter wave detected by the own vehicle sensor 61 and acquire the inter-vehicle distance D between the own vehicle 10 and the preceding vehicle 11 on the basis of the reflected millimeter wave detected by the own vehicle sensor 61.

The GPS device 70 is known and acquires a latitude and a longitude of a point where the own vehicle 10 travels on the basis of a GPS signal sent from an artificial satellite and stores the acquired latitude and longitude as a position of the own vehicle 10 in the RAM of the GPS device 70.

The wireless communication control ECU 80 is electrically connected to the wireless antenna 81 used for performing an inter-vehicle wireless communication. The wireless communication control ECU 80 is configured or programmed to receive communication information or communicating vehicle information and data that identifies the communicating vehicles sent from communicating vehicles through a wireless communication each time a predetermine time elapses and store the received data in the RAM of the wireless communication control ECU 80. Each of the communicating vehicles is different from the own vehicle and has a function that performs a wireless communication. The communicating vehicle information sent from each of the communicating vehicles includes data indicating operation state amounts of each of the communicating vehicles.

The data indicating the operation state amounts of each of the communicating vehicles received by the wireless communication control ECU 80 of the own vehicle 10 through the inter-vehicle wireless communication, includes data acquired by the vehicle control ECU 20, the engine control ECU 30, the brake control ECU 40 and the like of each of the communicating vehicle on the basis of detection signals output from various sensors of each of the communicating vehicles, data of states of the actuators of each of the communicating vehicles, to which the vehicle control ECU 20, the engine control ECU 30, the brake control ECU 40 and the like of each of the communicating vehicles send activation signals and the like.

In particular, the data sent from the communicating vehicle as communicated data includes data (A) to (G) described below.

(A) A traveling speed SPDs of the communicating vehicle acquired by the brake control ECU 40 of the communicating vehicle. Hereinafter, this traveling speed SPDs will be referred to as "the communicating vehicle speed SPDs".

(B) A position of the communicating vehicle acquired by the GPS device 70 of the communicating vehicle.

(C) A requested acceleration Gs of the communicating vehicle calculated by the engine control ECU 30 of the communicating vehicle on the basis of the acceleration pedal operation amount Accp of the communicating vehicle when any of a cooperative following travel control or a CACC (Cooperative Adaptive Cruise Control) and an inter-vehicle distance control or an ACC (Adaptive Cruise Control) is not executed in the communicating vehicle.

(D) A requested acceleration Gs of the communicating vehicle corresponding to a requested deceleration of the communicating vehicle calculated by the brake control ECU 40 of the communicating vehicle on the basis of the brake pedal operation amount Brkp of the communicating vehicle when any of the cooperative following travel control and the inter-vehicle distance control is not executed in the communicating vehicle.

(E) A requested acceleration Gs of the communicating vehicle calculated by the vehicle control ECU 20 of the communicating vehicle on the basis of the requested acceleration Gss of a vehicle traveling immediately in front of the communicating vehicle in order to cause the communicating vehicle to travel following the vehicle traveling immediately in front of the communicating vehicle when any of the cooperative following travel control and the inter-vehicle distance control is executed in the communicating vehicle.

(F) An actual acceleration Gas of the communicating vehicle acquired by the brake control ECU 40 of the communicating vehicle on the basis of the average vehicle wheel speed ωave of the communicating vehicle.

(G) A shift lever position signal S indicating the shift position SL of the shift lever 92 of the preceding vehicle 11.

Further, the wireless communication control ECU 80 is configured or programmed to send or output the above-described data indicating the operation state amounts of the own vehicle 10 to the outside of the own vehicle 10 each time a predetermined time elapses.

It should be noted that when any of the cooperative following travel control and the inter-vehicle distance control is executed in the own vehicle 10 and the preceding vehicle 11, the requested acceleration Gj of the own vehicle 10 sent from the wireless communication control ECU 80 of the own vehicle 10 to a vehicle traveling immediately behind the own vehicle 10 as the above-described data is a requested acceleration of the own vehicle 10 calculated on the basis of the requested acceleration Gs of the preceding vehicle 11.

Therefore, when any of the cooperative following travel control and the inter-vehicle distance control is executed in the preceding vehicle 11 and the vehicle traveling immediately in front of the preceding vehicle 11, the requested acceleration Gs of the preceding vehicle 11 received by the wireless communication control ECU 80 of the own vehicle 10 from the preceding vehicle 11 as the above-described data through the wireless communication is a requested acceleration of the preceding vehicle 11 calculated by the vehicle control ECU 20 of the preceding vehicle 11 on the basis of the requested acceleration Gss of the vehicle traveling immediately in front of the preceding vehicle 11.

<Summary of Cooperative Following Travel Control>

Below, a summary of the cooperative following travel control or the CACC executed by the embodiment control apparatus will be described. The embodiment control apparatus starts an execution of the cooperative following travel control when the CACC switch 21 is positioned at an ON-position by the occupant, in particular, the driver of the own vehicle 10. It should be noted that the vehicle control ECU 20 is configured or programmed to control an operation of the engine actuators 32 on the basis of the acceleration pedal operation amount Accp, the engine speed NE and the like when the CACC switch 21 is positioned at an OFF-position. In addition, the brake control ECU 40 is configured or programmed to control an operation of the brake actuator 43 on the basis of the brake pedal operation amount Brkp and the own vehicle speed SPDj or the vehicle wheel rotation speeds ωa to ωd of the vehicle wheels when the CACC switch 21 is positioned at an OFF-position.

When the vehicle control ECU 20 starts an execution of the cooperative following travel control, the vehicle control ECU 20 starts an execution of a process that identifies a communicating vehicle detected or acquired by the own vehicle sensor 61 among the communicating vehicles, which sends data to the own vehicle 10, as a communicating preceding vehicle on the basis of data acquired by the own vehicle sensor 61 and the sensor ECU 60 and data acquired by the wireless antenna 81 and the wireless communication control ECU 80.

For example, the vehicle control ECU 20 estimates a traveling speed of a candidate vehicle, which is a candidate of the communicating vehicle to be identified as the communicating preceding vehicle 11, on the basis of the relative vehicle speed dSPD and the own vehicle speed SPDj acquired by the sensor ECU 60. When a degree of a similarity between the estimated traveling speed of the candidate vehicle and the traveling speed of the candidate vehicle sent from the candidate vehicle through the wireless communication is high, the vehicle control ECU 20 identifies that candidate vehicle as the communicating preceding vehicle 11. For example, a method described in JP 5522193 B can be used as a method for identifying the communicating preceding vehicle 11.

Further, in this embodiment, a target value Ttgt of a value T obtained by dividing the inter-vehicle distance D by the own vehicle speed SPDj (T=D/SPDj), is previously set. Hereinafter, the value Ttgt will be referred to as "the target inter-vehicle time Ttgt". The target inter-vehicle time Ttgt is set to a predetermined constant value. In this regard, the target inter-vehicle time Ttgt may be variably set by a switch (not shown) operated by the driver of the own vehicle 10.

<Feedback Control>

The embodiment control apparatus controls the acceleration including the deceleration of the own vehicle 10 such that a value T obtained by dividing the actual inter-vehicle distance D by the actual own vehicle speed SPDj corresponds to the target inter-vehicle time Ttgt when the CACC switch 21 is set at an ON-position by the driver of the own vehicle 10. Hereinafter, the value T will be referred to as "the inter-vehicle time T".

For example, when the communicating preceding vehicle 11 accelerates under the condition that the inter-vehicle time T corresponds to the target inter-vehicle time Ttgt and the own vehicle speed SPDj is constant, the inter-vehicle distance D increases. As a result, the inter-vehicle time T becomes larger than the target inter-vehicle time Ttgt and thus, the embodiment control apparatus accelerates the own vehicle 10 to decrease the inter-vehicle time T.

On the other hand, when the communicating preceding vehicle 11 decelerates under the condition that the inter-vehicle time T corresponds to the target inter-vehicle time Ttgt and the own vehicle speed SPDj is constant, the inter-vehicle distance D decreases. As a result, the inter-vehicle time T becomes smaller than the target inter-vehicle time Ttgt and thus, the embodiment control apparatus decelerates the own vehicle 10 to increase the inter-vehicle time T.

When the embodiment control apparatus accelerates or decelerates the own vehicle 10, the embodiment control apparatus calculates or sets a requested acceleration Gj of the own vehicle 10 as described below and controls the engine control ECU 30 to cause the engine control ECU 30 to control the operation of the engine actuators 32 of the engine or controls the brake control ECU 40 to cause the brake control ECU 40 to control the operation of the brake actuator 43 of the braking device such that the requested acceleration Gj is achieved, that is, such that the acceleration of the own vehicle 10 corresponds to the requested acceleration Gj. The requested acceleration Gj can be any of a positive value for accelerating the own vehicle 10 and a negative value for decelerating the own vehicle 10. Thereby, the requested acceleration Gj can be referred to as a requested acceleration/deceleration Gj.

The embodiment control apparatus multiplies the target inter-vehicle time Ttgt by the actual own vehicle speed SPDj to calculate or acquire a target inter-vehicle distance Dtgt (=Ttgt×SPDj). In this embodiment, the target inter-vehicle time Ttgt is set to a constant value and thus, the calculated target inter-vehicle distance Dtgt increases as the actual own vehicle speed SPDj increases.

Further, the embodiment control apparatus calculates or acquires a difference dD of the target inter-vehicle distance Dtgt with respect to the actual inter-vehicle distance D (dD=D−Dtgt). Hereinafter, the difference dD will be referred to as "the inter-vehicle distance difference dD". The calculated inter-vehicle distance difference dD is a positive value when the actual inter-vehicle distance D is larger than the target inter-vehicle distance Dtgt.

In addition, the embodiment control apparatus acquires the relative traveling speed dSPD detected by the own vehicle sensor 61. The acquired relative traveling speed dSPD is a positive value when the traveling speed SPDs of the communicating preceding vehicle 11 is larger than the own vehicle speed SPDj. Hereinafter, the traveling speed SPDs will be referred to as "the preceding vehicle speed SPDs".

Then, the embodiment control apparatus calculates or acquires a total value of a value obtained by multiplying the inter-vehicle distance difference dD by a correction coefficient KFB1 and a value obtained by the relative traveling speed dSPD by a correction coefficient KFB2 as a determination-used calculation value P (=dD×KFB1+dSPD×KFB2). The correction coefficients KFB1 and KFB2 are set to positive constant values larger than "0", respectively.

When the determination-used calculation value P is a positive value, it can be determined that the acceleration of the own vehicle 10 is needed to maintain or control the inter-vehicle time T at or to the target inter-vehicle time Ttgt, that is, to maintain or control the inter-vehicle distance D at or to the target inter-vehicle distance Dtgt.

In this case, the embodiment control apparatus calculates or acquires a feedback requested acceleration GFB by multiplying the determination-used calculation value P by a correction coefficient KFB3 (GFB=(dD×KFB1+dSPD×KFB2)×KFB3). The correction coefficient KFB3 is a positive value larger than "0" and equal to or smaller than "1" and decreases as the own vehicle speed SPDj increases. Therefore, when the acceleration of the own vehicle 10 is needed, the calculated feedback requested acceleration GFB is a positive value.

On the other hand, when the determination-used calculation value P is a negative value, it can be determined that the deceleration of the own vehicle 10 is needed to maintain or control the inter-vehicle time T at or to the target inter-vehicle time Ttgt, that is, to maintain or control the inter-vehicle distance D at or to the target inter-vehicle distance Dtgt. In this case, the embodiment control apparatus acquires the determination-used calculation value P as the feedback requested acceleration GFB (=dD×KFB1+dSPD×KFB2). Therefore, when the deceleration of the own vehicle 10 is needed, the acquired feedback requested acceleration GFB is a negative value.

The embodiment control apparatus can control the inter-vehicle time T to the target inter-vehicle time Ttgt by accelerating or decelerating the own vehicle 10 such that the feedback requested acceleration GFB is achieved. In this regard, the inter-vehicle distance D and the relative traveling speed dSPD acquired by the sensor ECU 60 varies, for example, after the communicating preceding vehicle 11 starts to accelerate or decelerate. Therefore, if the acceleration or deceleration of the own vehicle 10 is controlled only using the feedback requested acceleration GFB, the start timing of the acceleration or deceleration of the own vehicle 10 delays with respect to the start timing of the acceleration or deceleration of the communicating preceding vehicle 11.

<Feedforward Control>

Accordingly, the embodiment control apparatus predicts the start of the acceleration or deceleration of the communicating preceding vehicle 11 on the basis of preceding vehicle acceleration information on the acceleration of the communicating preceding vehicle 11 acquired by the wireless communication control ECU 80 and controls the acceleration of the own vehicle 10 on the basis of the result of the prediction.

In particular, the embodiment control apparatus calculates or estimates or acquires the acceleration Ges of the communicating preceding vehicle 11 on the basis of a value fh(Gs) obtained by filtering the requested acceleration Gs of the communicating preceding vehicle 11 with a high-pass filter and a value hl(Gas) obtained by filtering the actual acceleration Gas of the communicating preceding vehicle 11 with a low-pass filter when the requested acceleration Gs and the actual acceleration Gas of the communicating preceding vehicle 11 have been acquired by the wireless communication control ECU 80. Hereinafter, the estimated acceleration Ges of the communicating preceding vehicle 11 will be simply referred to as "The estimated acceleration Ges".

Alternatively, the embodiment control apparatus acquires or estimates an actual acceleration Gas of the communicating preceding vehicle 11 as the estimated acceleration Ges of the communicating preceding vehicle 11 when only the actual acceleration Gas of the communicating preceding vehicle 11 is acquired by the wireless communication control ECU 80.

When the acceleration of the communicating preceding vehicle 11 is predicted, the calculated or acquired estimated acceleration Ges is a positive value. On the other hand, when the deceleration of the communicating preceding vehicle 11 is predicted, the calculated or acquired estimated acceleration Ges is a negative value.

The embodiment control apparatus calculates or acquires a value obtained by multiplying the calculated or acquired estimated acceleration Ges by a coefficient smaller than "1" as a feedforward requested acceleration GFF. When the acceleration of the communicating preceding vehicle 11 is predicted, the calculated feedforward requested acceleration GFF is a positive value. On the other hand, when the deceleration of the communicating preceding vehicle 11 is predicted, the calculated feedforward requested acceleration GFF is a negative value.

The embodiment control apparatus calculates or acquires a conclusive requested acceleration Gj of the own vehicle 10 by adding the feedforward requested acceleration GFF to the feedback requested acceleration GFB (Gj=GFF+GFB) and controls operations of the engine actuators 32 of the engine or an operation of the brake actuator 43 of the braking device such that the calculated requested acceleration Gj is achieved. When the own vehicle 10 should be accelerated, the calculated requested acceleration Gj is a positive value. On the other hand, when the own vehicle 10 should be decelerated, the calculated requested acceleration Gj is a negative value.

It should be noted that the conclusive requested acceleration Gj of the own vehicle 10 which is an acceleration obtained by adding the feedforward requested acceleration GFF to the feedback requested acceleration GFB will be referred to as "the CACC requested G" in some cases. The CACC corresponding to the cooperative following travel control is a control that makes the acceleration of the own vehicle 10 correspond to the CACC requested G. The ACC corresponding to the inter-vehicle distance control is a control that makes the acceleration of the own vehicle 10 correspond to the conclusive requested acceleration Gj corresponding to the feedback requested acceleration GFB without using the feedforward requested acceleration GFF.

The cooperative following travel control can accelerate or decelerate the own vehicle 10 while predicting the acceleration or deceleration of the communicating preceding vehicle 11. Therefore, the inter-vehicle time T can be controlled to the target inter-vehicle time Ttgt with a high following property. In other words, the own vehicle 10 can be traveled accurately following the communicating preceding vehicle 11.

<Control Considering Shift Lever Position of Communicating Preceding Vehicle>

When the shift lever 92 of the communicating preceding vehicle 11 is positioned at the N- or P-position, the acceleration pedal operation amount Accp of the communicating preceding vehicle 11 may increases. In this case, the communicating preceding vehicle 11 sends, to the own vehicle 10, a requested acceleration Gs calculated on the basis of the increased acceleration pedal operation amount Accp. However, even when the acceleration pedal operation amount Accp of the communicating preceding vehicle 11 increases under the condition that the shift lever 92 of the communicating preceding vehicle 11 is positioned at the N- or P-position, the communicating preceding vehicle 11 does not accelerate.

Therefore, if the requested acceleration Gj of the own vehicle 10 is set using the feedforward requested acceleration GFF set on the basis of the requested acceleration Gs sent from the communicating preceding vehicle 11, although the communicating preceding vehicle 11 does not accelerate, the own vehicle 10 may be caused to be accelerated at an acceleration depending on the requested acceleration Gs of the communicating preceding vehicle 11 and thus, the inter-vehicle distance D may decrease.

Further, when the acceleration pedal operation amount Accp of the communicating preceding vehicle 11 increases under the condition that the shift lever 92 of the communicating preceding vehicle 11 is positioned at the R-position, the communicating preceding vehicle 11 travels rearward. Also, in this case, the communicating preceding vehicle 11 sends, to the own vehicle 10, a requested acceleration Gs calculated on the basis of the increased acceleration pedal operation amount Accp.

In this case, the requested acceleration Gs of the communicating preceding vehicle 11 sent from the communicating preceding vehicle 11 to the own vehicle 10 is calculated on the basis of the increased acceleration pedal operation amount Accp and thus, the requested acceleration Gs is a positive value. Therefore, if the requested acceleration Gj of the own vehicle 10 is set using the feedforward requested acceleration GFF calculated on the basis of the requested acceleration Gs, although the communicating preceding vehicle 11 travels rearward, the own vehicle 10 may be caused to be accelerated forward at an acceleration depending on the requested acceleration Gs of the communicating preceding vehicle 11 and thus, the inter-vehicle distance may decrease. This may occurs, for example, when the own vehicle 10 and the communicating preceding vehicle 11 travel on a congested road.

Accordingly, the embodiment control apparatus sets the feedforward requested acceleration GFF to zero when the feedforward requested acceleration GFF calculated as described above is larger than zero under the condition that the shift lever 92 of the communicating preceding vehicle 11 is positioned at the N- or P- or R-position, that is, under the condition that the shift lever 92 of the communicating preceding vehicle 11 is positioned at a shift position other than the shift positions for traveling the communicating preceding vehicle 11 forward. In other words, in this case, the embodiment control apparatus sets an upper limit of the feedforward requested acceleration GFF to zero. That is, in this case, the embodiment control apparatus limits the feedforward requested acceleration GFF to a value equal to or smaller than zero.

Thereby, when the shift lever 92 of the communicating preceding vehicle 11 is positioned at a shift position other than the shift positions for traveling the communicating preceding vehicle 11 forward and thus, the communicating preceding vehicle 11 does not accelerate forward, the own vehicle 10 is not accelerated forward due to the feedforward requested acceleration GFF. As a result, the inter-vehicle distance D does not decrease excessively and thus, the own vehicle 10 can be caused to be traveled following the communicating preceding vehicle 11.

It should be noted that when the calculated feedforward requested acceleration GFF is smaller than zero under the condition that the shift lever 92 of the communicating preceding vehicle 11 is positioned at the N- or P- or R-position, the requested acceleration Gj of the own vehicle 10 is set using the calculated feedforward requested acceleration GFF. In this case, the own vehicle 10 is decelerated such that the inter-vehicle distance D increases and thus, the occupants including the driver of the own vehicle 10 does not feel anxious.

<Actual Operation>

Next, the cooperative following travel control (the CACC) executed by the embodiment control apparatus will be concretely described. The CPU of the vehicle control ECU 20 is programmed or configured to start an execution of a routine shown by a flowchart in FIG. 2 each time a predetermined time elapses. Therefore, at a predetermined timing, the CPU starts an execution of this routine from a step 200 and then, proceeds with the process to a step 205 to determine whether or not the CACC switch 21 is positioned at the ON-position.

Figure 2:
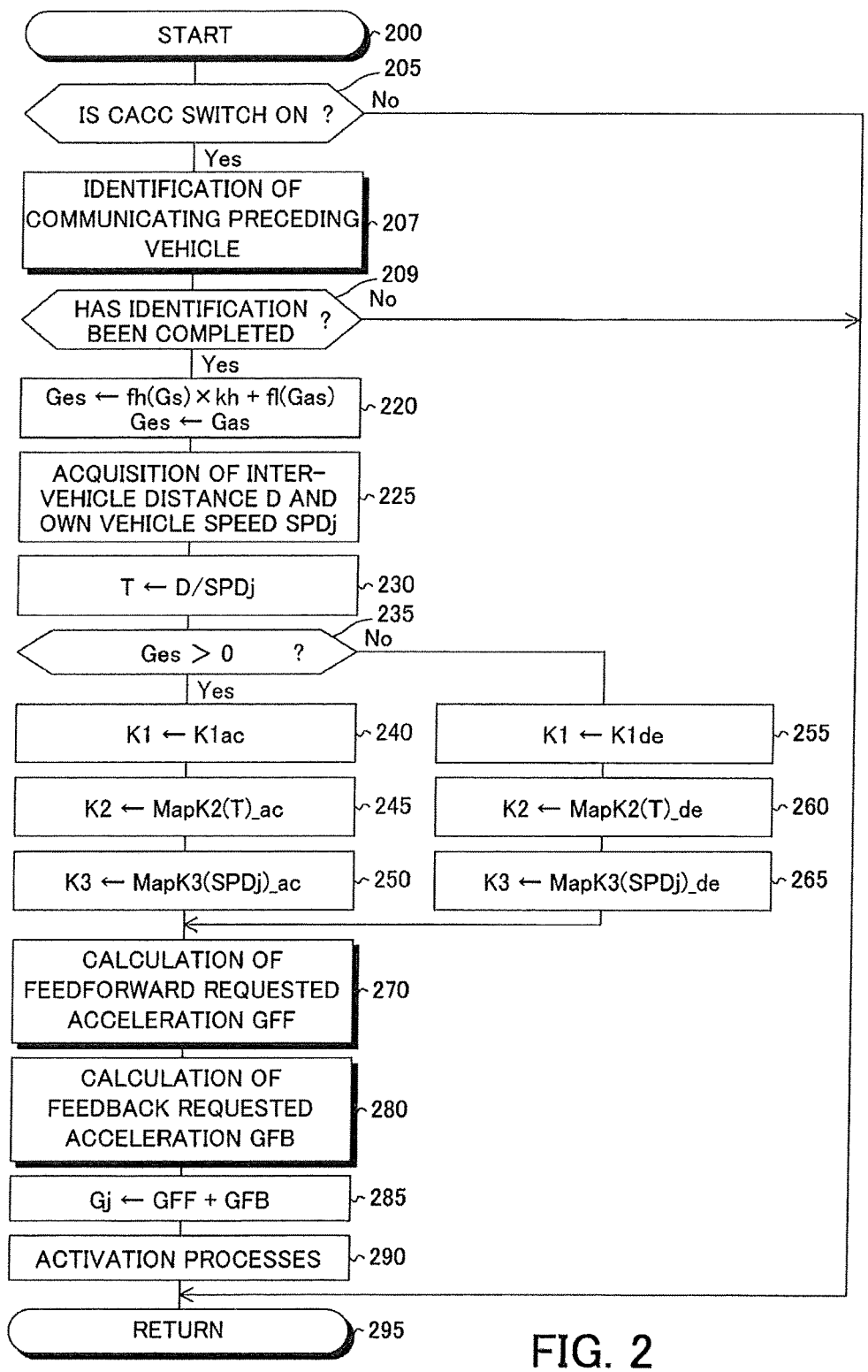
FIG. 2 shows a flowchart of a routine executed by a CPU of a vehicle control ECU shown in FIG. 1.
Figure 3:
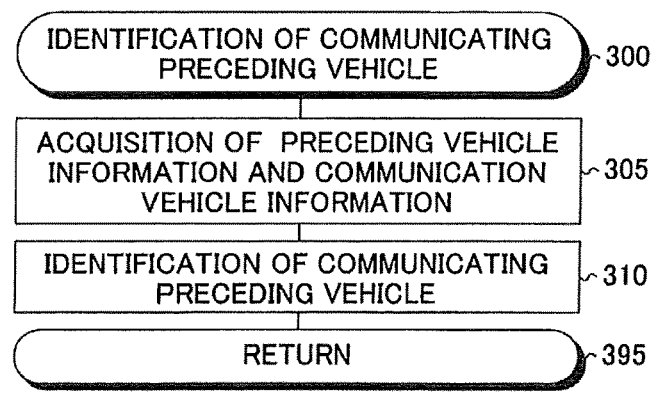
FIG. 3 shows a flowchart of a routine executed by the CPU.

When the CACC switch 21 is positioned at the ON-position, the CPU determines "Yes" at the step 205 and then, proceeds with the process to a step 207 to start an execution of a routine shown by a flowchart in FIG. 3 to identify the communicating preceding vehicle 11. That is, when the CPU proceeds with the process to the step 207, the CPU starts an execution of the routine from a step 300 of FIG. 3 and then, executes processes of steps 305 and 310 described below. Then, the CPU proceeds with the process to a step 209 of FIG. 2 via a step 395.

Step 305: The CPU acquires preceding vehicle information including data of the operation state amounts of the preceding vehicle from the sensor ECU 60 and acquires communicating vehicle information including data of the operation state amounts of the communicating vehicles from the wireless communication control ECU 80.

Step 310: The CPU identifies the communicating preceding vehicle 11 among the communicating vehicles on the basis of the operation state amounts of the communicating vehicles included in the communicating vehicle information and the operation state amounts of the preceding vehicle 11 included in the preceding vehicle information. For example, the CPU calculates or estimates the traveling speed of the preceding vehicle 11 on the basis of the relative traveling speed dSPD acquired by the own vehicle sensor 61 and the own vehicle speed SPDj. Then, when the degree of the similarity between the calculated traveling speed of the preceding vehicle 11 and the traveling speed of the communicating vehicle sent from the communicating vehicle through a wireless communication is large, the CPU identifies that communicating vehicle as the communicating preceding vehicle 11.

It should be noted that after a particular communicating vehicle is identified as the communicating preceding vehicle 11 by the execution of the process of the step 310 once, the identified communicating vehicle is employed as the communicating preceding vehicle 11 until the CPU determines that the identified communicating vehicle is not the preceding vehicle 11.

When the CPU proceeds with the process to the step 209, the CPU determines whether or not the identification of the communicating preceding vehicle 11 has been completed at the step 207. When the identification of the communicating preceding vehicle 11 has been completed, the CPU determines "Yes" at the step 209 and then, sequentially executes processes of steps 220 to 230 described below.

Step 220: The CPU calculates or acquires, as the estimated acceleration Ges (=fh(Gs)+fl(Gas)), a total value of a value obtained by multiplying a value fh(Gs) obtained by filtering the requested acceleration Gs of the communicating preceding vehicle 11 with the high-pass filter by a predetermined positive coefficient kh (in this embodiment, "1") and a value fl(Gas) obtained by filtering the actual acceleration Gas of the communicating preceding vehicle 11 with the low-pass filter when the requested acceleration Gs and the actual acceleration Gas are included in the communicating vehicle information acquired at the step 207 (in particular, the step 305 of FIG. 3) and relating to the communicating vehicle identified as the communicating preceding vehicle 11 at the step 207 (in particular, at the step 310 of FIG. 3). Hereinafter, the communicating vehicle information will be referred to as "the communicating preceding vehicle information".

Alternatively, the CPU employs the actual acceleration Gas as the estimated acceleration Ges when no requested acceleration Gs is included in the communicating preceding vehicle information and only the actual acceleration Gas is included in the communicating preceding vehicle information.

Step 225: The CPU acquires the inter-vehicle distance D from the sensor ECU 60 and acquires the own vehicle speed SPDj from the brake control ECU 40. The sensor ECU 60 executes a separate routine to acquire the inter-vehicle distance D on the basis of the detection signal of the own vehicle sensor 61 and store the acquired inter-vehicle distance D in the RAM of the sensor ECU 60. The brake control ECU 40 executes a separate routine to acquire the own vehicle speed SPDj on the basis of the detection signal of the vehicle wheel speed sensors 42 and store the acquired own vehicle speed SPDj in the RAM of the brake control ECU 40.

Step 230: The CPU calculates or acquires a value obtained by dividing the inter-vehicle distance D by the own vehicle speed SPDj as the inter-vehicle time T (=D/SPDj). The inter-vehicle time T is a time taken for the own vehicle 10 to travel for the inter-vehicle distance D at the own vehicle speed SPDj.

Next, the CPU proceeds with the process to a step 235 to determine whether or not the estimated acceleration Ges calculated or acquired at the step 220 is larger than zero. When the estimated acceleration Ges is larger than zero, the CPU determines "Yes" at the step 235 and then, sequentially executes processes of steps 240 to 250 described below. Then, the CPU proceeds with the process to a step 270.

Step 240: The CPU sets a first correction coefficient Klac for the acceleration as the first correction coefficient K1. The first correction coefficient Klac for the acceleration is a constant value smaller than "1". In this regard, the first correction coefficient Klac for the acceleration may be "1".

Figure 6A:
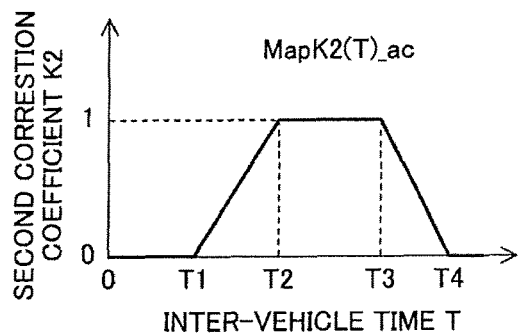
FIG. 6(A) shows a look-up table used for acquiring a second correction coefficient for an acceleration on the basis of an inter-vehicle time.

Step 245: The CPU applies the inter-vehicle time T to a look-up table MapK2(T)_ac shown in FIG. 6(A) to acquire the second correction coefficient K2 for the acceleration. According to the look-up table MapK2(T)_ac, when the inter-vehicle time T is between "0" and a time T1, the second correction coefficient K2 for the acceleration is "0". When the inter-vehicle time T is between the time T1 and a time T2, the second correction coefficient K2 for the acceleration is a value equal to or smaller than "1" and increases as the inter-vehicle time T increases. When the inter-vehicle time T is between the time T2 and a time T3, the second correction coefficient K2 for the acceleration is "1". When the inter-vehicle time T is between the time T3 and a time T4, the second correction coefficient K2 for the acceleration is a value equal to or smaller than "1" and decreases as the inter-vehicle time T increases. When the inter-vehicle time T is larger than the time T4, the second correction coefficient K2 for the acceleration is "0".

Figure 6B:
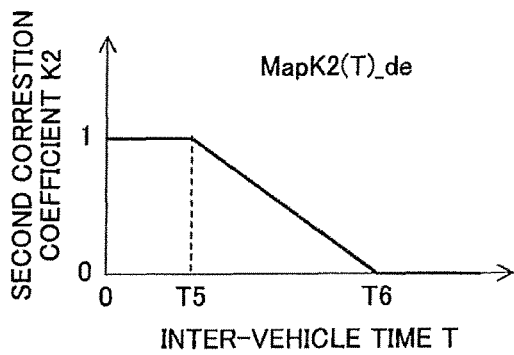
FIG. 6(B) shows a look-up table used for acquiring a second correction coefficient for a deceleration on the basis of the inter-vehicle time.
Figure 6C:
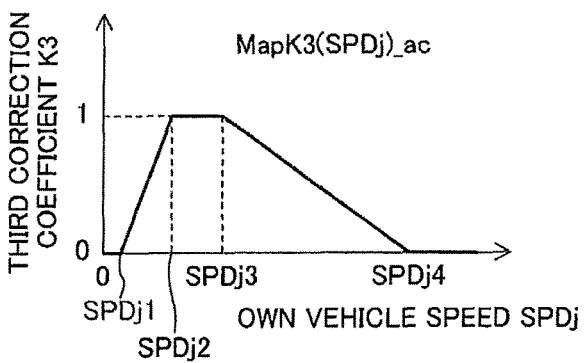
FIG. 6(C) shows a look-up table used for acquiring a third correction coefficient for an acceleration on the basis of a speed of an own vehicle.

Step 250: The CPU applies the own vehicle speed SPDj to a look-up table MapK3(SPDj)_ac shown in FIG. 6(C) to acquire the third correction coefficient K3 for the acceleration. According to the look-up table MapK3(SPDj)_ac, when the own vehicle speed SPDj is between "0" and a vehicle speed SPDj1, the third correction coefficient K3 for the acceleration is "0". When the own vehicle speed SPDj is between the vehicle speed SPDj1 and a vehicle speed SPDj2, the third correction coefficient K3 for the acceleration is equal to or smaller than "1" and increases as the own vehicle speed SPDj increases. When the own vehicle speed SPDj is between the vehicle speed SPDj2 and a vehicle speed SPDj3, the third correction coefficient K3 for the acceleration is "1". When the own vehicle speed SPDj is between the vehicle speed SPDj3 and a vehicle speed SPDj4, the third correction coefficient K3 for the acceleration is equal to or smaller than "1" and decreases as the own vehicle speed SPDj increases. When the own vehicle speed SPDj is larger than the vehicle speed SPDj4, the third correction coefficient K3 for the acceleration is "0".

When the estimated acceleration Ges is equal to or smaller than "0" upon the execution of the process of the step 235, the CPU determines "No" at the step 235 and then, sequentially executes processes of steps 255 to 265 described below. Then, the CPU proceeds with the process to a step 270.

Step 255: The CPU sets a first correction coefficient Klde for the deceleration as the first correction coefficient K1. The first correction coefficient Klde for the deceleration is a constant value smaller than "1" and equal to or larger than the first correction coefficient Klac for the acceleration. In this regard, the first correction coefficient Klde for the deceleration may be "1".

Step 260: The CPU applies the inter-vehicle time T to a look-up table MapK2(T)_de shown in FIG. 6(B) to acquire the second correction coefficient K2 for the deceleration. According to the look-up table MapK2(T)_de, when the inter-vehicle time T is between "0" and a time T5, the second correction coefficient K2 for the deceleration is "1". When the inter-vehicle time T is between the time T5 and a time T6, the second correction coefficient K2 for the deceleration is equal to or smaller than "1" and decreases as the inter-vehicle time T increases. When the inter-vehicle time T is larger than the time T6, the second correction coefficient K2 for the deceleration is "0".

Figure 6D:
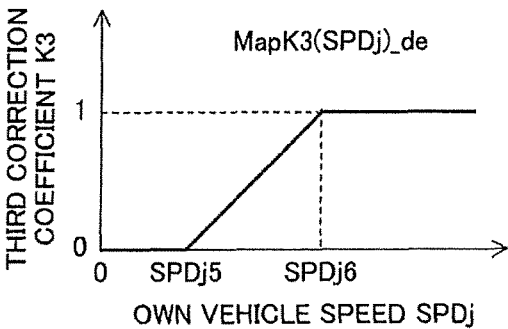
FIG. 6(D) shows a look-up table used for acquiring a third correction coefficient for a deceleration on the basis of the speed of the own vehicle.

Step 265: The CPU applies the own vehicle speed SPDj to a look-up table MapK3(SPDj)_de shown in FIG. 6(D) to acquire the third correction coefficient K3 for the deceleration. According to the look-up table MapK3(SPDj)_de, when the own vehicle speed SPDj is between "0" and a vehicle speed SPDj5, the third correction coefficient K3 for the deceleration is "0". When the own vehicle speed SPDj is between the vehicle speed SPDj5 and a vehicle speed SPDj6, the third correction coefficient K3 for the deceleration is equal to or smaller than "1" and increases as the own vehicle speed SPDj increases. When the own vehicle speed SPDj is larger than the vehicle speed SPDj6, the third correction coefficient K3 for the deceleration is equal to or smaller than "1" and increases as the own vehicle speed SPDj increases.

Figure 4:
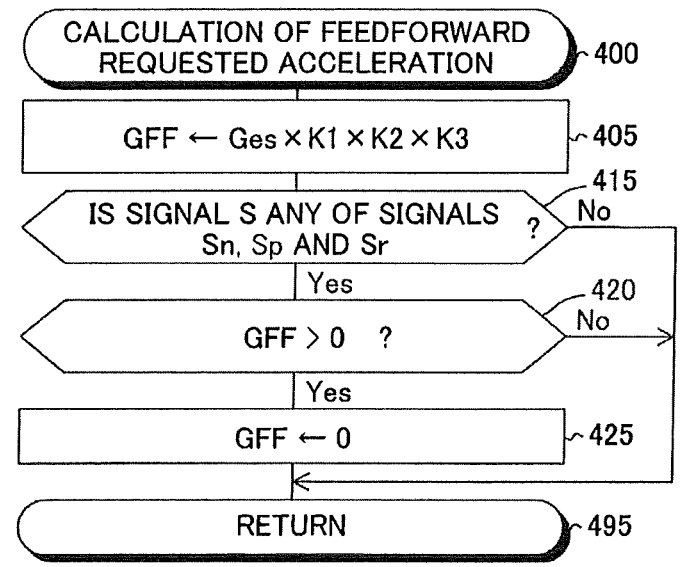
FIG. 4 shows a flowchart of a routine executed by the CPU.

When the CPU proceeds with the process to the step 270, the CPU starts an execution of a feedforward requested acceleration calculation routine shown by a flowchart in FIG. 4 to calculate the feedforward requested acceleration GFF. Therefore, when the CPU proceeds with the process to the step 270, the CPU starts an execution of the routine from a step 400 of FIG. 4 and then, executes a process of step 405 described below.

Step 405: The CPU calculates or acquires the feedforward requested acceleration GFF in accordance with a following expression (1).

$$GFF = Ges \times K1 \times K2 \times K3 \qquad (1)$$

In the expression (1), the symbol "Ges" is the estimated acceleration calculated or acquired at the step 220 of FIG. 2, the symbol "K1" is the first correction value set at the step 240 or 255, the symbol "K2" is the second correction value set at the step 245 or 260 and the symbol "K3" is the third correction value set at the step 250 or 265.

Next, the CPU proceeds with the process to a step 415 to determine whether or not the shift lever position signal S included in the communicating preceding vehicle information acquired at the step 207 (in particular, at the step 305 of FIG. 3) is any of the signals Sn, Sp and Sr indicating that the shift lever 92 of the communicating preceding vehicle 11 is positioned at the N-, P- and R-positions, respectively.

When the shift lever position signal S is any of the signals Sn, Sp and Sr, the CPU determines "Yes" at the step 415 and then, proceeds with the process to a step 420 to determine whether or not the feedforward requested acceleration GFF calculated at the step 405 is larger than zero.

When the feedforward requested acceleration GFF is larger than zero, the CPU determines "Yes" at the step 420 and then, proceeds with the process to a step 425 to set the feedforward requested acceleration GFF to zero. Then, the CPU proceeds with the process to a step 280 of FIG. 2 via a step 495. On the other hand, when the feedforward requested acceleration GFF is equal to or smaller than zero, the CPU determines "No" at the step 420 and then, proceeds with the process directly to the step 280 of FIG. 2 via the step 495. As a result, the feedforward requested acceleration GFF is limited to a value equal to or smaller than zero.

On the other hand, when the shift lever position signal S is not any of the signals Sn, Sp and Sr, that is, the shift lever position signal S is any of the signals Sd and Sb upon the execution of the process of the step 415, the CPU determines "No" at the step 415 and then, proceeds with the process to the step 280 of FIG. 2 via the step 495.

Figure 5:
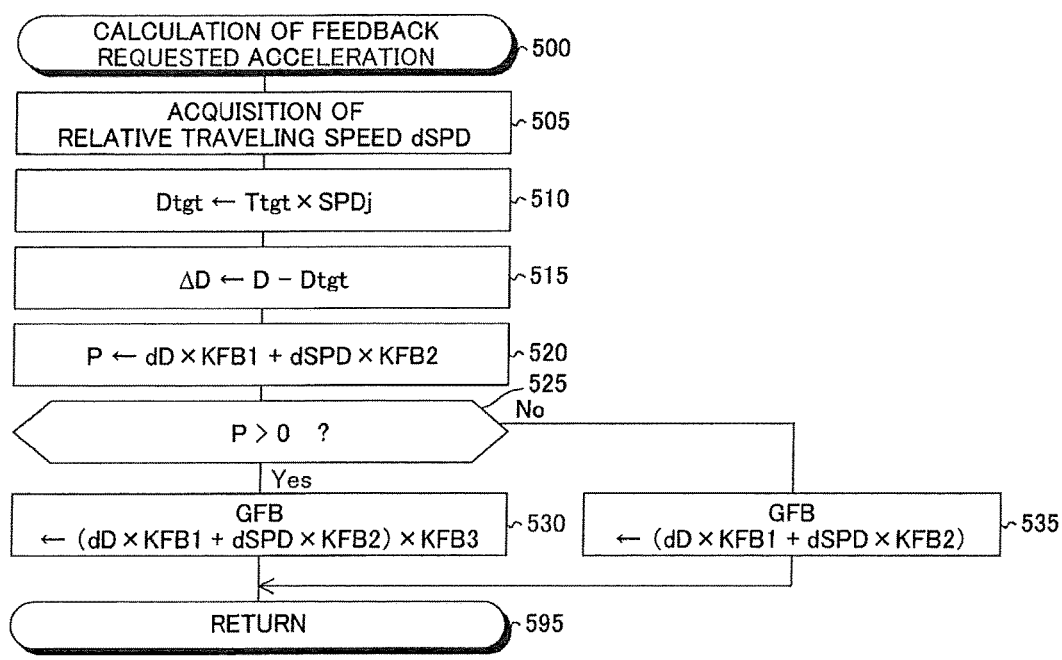
FIG. 5 shows a flowchart of a routine executed by the CPU.

When the CPU proceeds with the process to the step 280, the CPU starts an execution of a feedback requested acceleration calculation routine shown by a flowchart in FIG. 5 to calculate the feedback requested acceleration GFB. Therefore, when the CPU proceeds with the process to the step 280, the CPU starts the execution of the routine from a step 500 of FIG. 5 and then, sequentially executes processes of steps 505 and 520 described below.

Step 505: The CPU acquires the relative traveling speed dSPD from the sensor ECU 60. The sensor ECU 60 executes a separate routine to acquire the relative traveling speed dSPD on the basis of the detection signal of the own vehicle sensor 61 and store the acquired relative traveling speed dSPD in the RAM of the sensor ECU 60.

Step 510: The CPU calculates or acquires the target inter-vehicle distance Dtgt by multiplying the target inter-vehicle time Ttgt by the own vehicle speed SPDj acquired at the step 225 of FIG. 2 (Dtgt=Ttgt×SPDj). As described above, the target inter-vehicle time Ttgt is set to a constant value.

Step 515: The CPU calculates or acquires the inter-vehicle distance difference dD by subtracting the target inter-vehicle distance Dtgt from the inter-vehicle distance D acquired at the step 225 of FIG. 2 (dD=D−Dtgt).

Step 520: The CPU calculates or acquires the determination-used calculation value P in accordance with a following expression (2).

$$P = dD \times KFB1 + dSPD \times KFB2 \qquad (2)$$

In the expression (2), the symbol "dD" is the inter-vehicle distance difference calculated at the step 515, the symbol "dSPD" is the relative traveling speed acquired at the step 505 and the symbols "KFB1" and "KFB2" are correction coefficients, respectively, which are positive constant values larger than "0".

Then, the CPU proceeds with the process to a step 525 to determine whether or not the determination-used calculation value P is larger than zero. The determination-used calculation value P larger than zero indicates that the acceleration request due to the inter-vehicle distance D occurs in the own vehicle 10 and the determination-used calculation value P equal to or smaller than zero indicates that no acceleration request due to the inter-vehicle distance D occurs in the own vehicle 10.

When the determination-used calculation value P is larger than zero, the CPU determines "Yes" at the step 525 and then, proceeds with the process to a step 530 to calculate or acquire the feedback requested acceleration GFB in accordance with a following expression (3). Then, the CPU proceeds with the process to a step 285 of FIG. 2 via a step 595.

$$GFB = (dD \times KFB1 + dSPD \times KFB2) \times KFB3 \qquad (3)$$

In the expression (3), the symbol "KFB3" is a correction coefficient which is a positive value larger than "0" and smaller than "1" and decreases as the own vehicle speed SPDj increases.

On the other hand, when the determination-used calculation value P is equal to or smaller than zero upon the execution of the process of the step 525, the CPU determines "No" at the step 525 and then, proceeds with the process to a step 535 to calculate or acquire the feedback requested acceleration GFB in accordance with a following expression (4). Then, the CPU proceeds with the process to a step 285 of FIG. 2 via the step 595.

$$GFB = dD \times KFB1 + dSPD \times KFB2 \qquad (4)$$

When the CPU proceeds with the process to the step 285 of FIG. 2, the CPU calculates or acquires the requested acceleration Gj of the own vehicle 10 by adding the feedback requested acceleration GFB calculated at the step 280 to the feedforward requested acceleration GFF calculated at the step 270 (Gj=GFF+GFB).

Then, the CPU proceeds with the process to a step 290 to execute processes for activating the engine actuators 32 of the engine or the brake actuator 43 of the braking device such that the requested acceleration Gj calculated at the step 285 is achieved, that is, such that the acceleration (in particular, acceleration/deceleration) of the own vehicle 10 corresponds to the requested acceleration Gj. Thereby, when the requested acceleration Gj is larger than zero, the own vehicle 10 is accelerated. On the other hand, when the requested acceleration Gj is smaller than zero, the own vehicle 10 is decelerated. Then, the CPU proceeds with the process to a step 295 to terminate the execution of this routine once.

It should be noted that when the CACC switch 21 is positioned at the OFF-position upon the execution of the process of the step 205, the CPU determines "No" at the step 205 and then, proceeds with the process directly to the step 295 to terminate the execution of this routine once.

Further, when the identification of the communicating preceding vehicle 11 has not been completed upon the execution of the process of the step 209, the CPU determines "No" at the step 209 and then, proceeds with the process directly to the step 295 to terminate the execution of this routine once.

It should be noted that when the identification of the communicating preceding vehicle 11 has not been completed, however, a vehicle is acquired by the own vehicle sensor 61 and the sensor ECU 60 as the preceding vehicle 11, in other words, the relative traveling speed dSPD, the inter-vehicle distance D, the relative orientation and the like have been acquired upon the execution of the process of the step 209, the CPU may proceed with the process to the step 280 after the CPU sets the feedforward requested acceleration GFF to zero. In this case, the feedback control (i.e., the inter-vehicle distance control) on the basis of the feedback requested acceleration GFB is executed.

The concrete cooperative following travel control executed by the embodiment control apparatus has been described. According to this control, when the shift lever 92 of the communicating preceding vehicle 11 is positioned at the N- or P- or R-position, the feedforward requested acceleration GFF is set to zero and thus, as described above, the own vehicle 10 can be caused to be traveled accurately following the communicating preceding vehicle 11.

It should be noted that when the feedforward requested acceleration GFF is a negative value, for example, when the brake pedal operation amount Brkp of the communicating preceding vehicle 11 increases or when any of the vehicle wheel speeds ωa to ωd of the communicating preceding vehicle 11 decreases even under the condition that the shift lever 92 of the communicating preceding vehicle 11 is positioned at the N- or P- or R-position, the feedforward requested acceleration GFF is considered in the calculation of the requested acceleration Gj of the own vehicle 10 without setting the feedforward requested acceleration GFF to zero. Therefore, when the communicating preceding vehicle 11 starts to decelerate, the own vehicle 10 can be caused to be decelerated with predicting the deceleration of the communicating preceding vehicle 11 and thus, the own vehicle 10 can be caused to be traveled accurately following the communicating preceding vehicle 11 without decreasing the inter-vehicle distance D.

The present disclosure is not limited to the embodiment and various modifications can be employed within a scope of the present disclosure.

For example, when the estimated acceleration Ges is larger than zero, the control apparatus according to the embodiment may be configured simply to calculate, as the feedforward requested acceleration GFF, a value obtained by multiplying the estimated acceleration Ges by a predetermined positive correction coefficient Kllac (GFF=Ges×Kllac).

Further, when the estimated acceleration Ges is equal to or smaller than zero, the control apparatus according to the embodiment may be configured simply to calculate, as the feedforward requested acceleration GFF, a value obtained by multiplying the estimated acceleration Ges by a predetermined positive correction coefficient Klde (GFF=Ges× Klde).

Further, at the step 285, the total value of the feedback requested acceleration GFB and the feedforward requested acceleration GFF is calculated as the requested acceleration Gj of the own vehicle 10. However, for example, a weighted average of the feedback requested acceleration GFB and the feedforward requested acceleration GFF may be calculated as the requested acceleration Gj of the own vehicle 10. In other words, the requested acceleration Gj of the own vehicle 10 may be calculated in accordance with a following expression (5). In the expression (5), the symbols "α" and "β" are positive constants, respectively. The constants α and β are larger than "0" and smaller than "1" and the constant α may be a value 1−β.

$$Gj = \alpha \times GFF + \beta \times GFB \quad (5)$$

Further, the control apparatus according to the embodiment may be configured simply to calculate, as the feedback requested acceleration GFB, a value obtained by multiplying the inter-vehicle distance difference dD by a predetermined correction coefficient KFB (GFB=KFB×dD). The correction coefficient KFB is a constant positive value larger than "0".

In addition, the control apparatus according to the embodiment calculates the feedforward requested acceleration GFF on the basis of the requested acceleration Gs and the actual acceleration Gas of the communicating preceding vehicle 11 acquired through the wireless communication. In this regard, the control apparatus may calculate the feedforward requested acceleration GFF only on the basis of the requested acceleration Gs without using the actual acceleration Gas or only on the basis of the actual acceleration Gas without using the requested acceleration Gs.

Further, when the acceleration pedal operation amount Accp and the brake pedal operation amount Brkp in place of the requested acceleration Gs are sent from the communicating preceding vehicle 11, the control apparatus according to the embodiment may be configured to acquire the acceleration pedal operation amount Accp and the brake pedal operation amount Brkp as information on the requested acceleration Gs of the communicating preceding vehicle 11, estimate the requested acceleration Gs of the communicating preceding vehicle 11 on the basis of the acceleration pedal operation amount Accp and the brake pedal operation amount Brkp and calculate the feedforward requested acceleration GFF using the estimated requested acceleration Gs.

Similarly, when the vehicle wheel rotation speeds ωa to ωd or the average vehicle wheel rotation speed ωave in place of the actual acceleration Gas is/are sent from the communicating preceding vehicle 11, the control apparatus according to the embodiment may be configured to acquire the vehicle wheel rotation speeds ωa to ωd or the average vehicle wheel rotation speed ωave as information on the actual acceleration Gas of the communicating preceding vehicle 11, estimate the actual acceleration Gas of the communicating preceding vehicle 11 on the basis of the vehicle wheel rotation speeds ωa to ωd or the average vehicle wheel rotation speed ωave and calculate the feedforward requested acceleration GFF using the estimated actual acceleration Gas.

What is claimed is:

1. A control apparatus of a vehicle, comprising:
   an inter-vehicle distance detection device that detects an inter-vehicle distance between an own vehicle and a communicating preceding vehicle;
   a wireless device that acquires communicating preceding vehicle information including requested acceleration information on a requested acceleration of the communicating preceding vehicle from the communicating preceding vehicle through a wireless communication; and
   an electronic control unit configured to:
      calculate a feedback requested acceleration which is an acceleration requested to the own vehicle for maintaining the inter-vehicle distance to a target inter-vehicle distance;
      calculate as a feedforward requested acceleration which is an acceleration requested to the own vehicle for causing the own vehicle to travel following the communicating preceding vehicle on the basis of the requested acceleration information;
      calculate a requested acceleration of the own vehicle on the basis of the feedback requested acceleration and the feedforward requested acceleration; and
      execute a following travel control that causes the own vehicle to travel following the communicating preceding vehicle by controlling the acceleration of the own vehicle such that the acceleration of the own vehicle corresponds to the requested acceleration of the own vehicle,
   wherein the electronic control unit is configured to set the feedforward requested acceleration to zero when the communicating preceding vehicle information includes information indicating that a shift lever of the communicating preceding vehicle is positioned at a shift position other than a shift position that causes the communicating preceding vehicle to travel forward and the feedforward requested acceleration is larger than zero.

2. The control apparatus according to claim 1, wherein when a control apparatus of the communicating preceding vehicle does not execute a same control that causes the communicating preceding vehicle to travel following a vehicle traveling in front of the communicating preceding vehicle as the following travel control executed by the electronic control unit, the requested acceleration of the communicating preceding vehicle is a requested acceleration calculated by the control apparatus of the communicating preceding vehicle on the basis of an operation amount of an acceleration operation element of the communicating preceding vehicle and an operation amount of a brake operation element of the communicating preceding vehicle.

3. The control apparatus according to claim 1, wherein when a control apparatus of the communicating preceding vehicle executes a same control that causes the communicating preceding vehicle to travel following a vehicle traveling in front of the communicating preceding vehicle as the following travel control executed by the electronic control unit, the requested acceleration of the communicating preceding vehicle is a requested acceleration of the communicating preceding vehicle calculated by the control apparatus of the communicating preceding vehicle on the basis of acceleration information on the acceleration of the vehicle traveling in front of the communicating preceding vehicle acquired by the control apparatus of the communicating preceding vehicle from the vehicle traveling in front of the communicating preceding vehicle through a wireless communication.

4. The control apparatus according to claim 1, wherein the wireless device acquires actual acceleration information from the communicating preceding vehicle through the wireless communication, the actual acceleration information relating to an actual acceleration of the communicating preceding vehicle calculated by a control apparatus of the communicating preceding vehicle on the basis of at least one vehicle wheel speed of the communicating preceding vehicle detected by a vehicle wheel speed sensor of the communicating preceding vehicle, and the electronic control unit is configured to calculate the feedforward requested acceleration on the basis of the acquired actual acceleration information and the acquired requested acceleration information.

* * * * *